United States Patent
Copeland et al.

(10) Patent No.: US 12,266,016 B2
(45) Date of Patent: *Apr. 1, 2025

(54) PURCHASING AND MONETIZING OF MOBILE AUTONOMOUS UNITS

(71) Applicant: Wells Fargo Bank, N.A., San Francisco, CA (US)

(72) Inventors: Jennifer L. Copeland, San Francisco, CA (US); Suzanne M. Fisi, Clayton, CA (US); Simone O. Harvey, Berkeley, CA (US); David C. Hatch, Pacifica, CA (US); Muhammad Farukh Munir, Pittsburg, CA (US); Aaron Francis Colfax Petrik, Alameda, CA (US); Darrell L. Suen, San Ramon, CA (US); Timothy R. Ward, Mesa, AZ (US); Steven J. Wirt, Oakland, CA (US); Ryan J. Wyler, Gilbert, AZ (US); Nancy B. Zimmerman, Fairfax, CA (US); Chris Kalaboukis, San Jose, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,535

(22) Filed: Mar. 17, 2023

(65) Prior Publication Data

US 2023/0222596 A1 Jul. 13, 2023

Related U.S. Application Data

(63) Continuation of application No. 16/852,890, filed on Apr. 20, 2020, now Pat. No. 11,699,189, which is a
(Continued)

(51) Int. Cl.
*G06Q 30/0601* (2023.01)
*B60P 3/32* (2006.01)
(Continued)

(52) U.S. Cl.
CPC .............. *G06Q 40/06* (2013.01); *B60P 3/32* (2013.01); *G01W 1/10* (2013.01); *G05D 1/0088* (2013.01);
(Continued)

(58) Field of Classification Search
None
See application file for complete search history.

(56) References Cited

U.S. PATENT DOCUMENTS 5,662,373 A 9/1997 Hanemaayer
7,234,759 B1 6/2007 Alohali
(Continued)

FOREIGN PATENT DOCUMENTS

| | | |
|---|---|---|
| CN | 2673725 Y | 1/2005 |
| EP | 1547860 | 6/2005 |
| RU | 74348 U1 * | 6/2008 |

OTHER PUBLICATIONS

American Limousine Sales, "Top Limousine Entertainment Features Make it More Marketable," Dec. 19, 2016, https://americanlimousinesales.com/top-limousine-entertainment-features/, archived at Wayback Machine, accessed Apr. 20, 2024 (Year: 2016).*

(Continued)

*Primary Examiner* — Michelle T Kringen
(74) *Attorney, Agent, or Firm* — Merchant & Gould P.C.

(57) ABSTRACT

Purchasing, maintaining, and deriving revenue from mobile autonomous units is facilitated by providing a mobile autonomous unit marketplace in which equity shares in mobile autonomous units can be bought, sold and traded.

(Continued)

Valuation of mobile autonomous units within the marketplace can be a function of a variety of factors such as the mobile autonomous unit's primary geographic region, and the number, diversity, and time management of revenue streams available to the mobile autonomous units.

20 Claims, 12 Drawing Sheets

Related U.S. Application Data continuation of application No. 15/423,792, filed on Feb. 3, 2017, now Pat. No. 10,664,915.

(51) Int. Cl.
  *G01W 1/10* (2006.01)
  *G05D 1/00* (2006.01)
  *G06Q 40/06* (2012.01)
  *H02J 3/00* (2006.01)

(52) U.S. Cl.
  CPC .......... *G06Q 30/0641* (2013.01); *H02J 3/004* (2020.01); *H02J 2300/28* (2020.01)

(56) References Cited

U.S. PATENT DOCUMENTS

| | | |
|---|---|---|
| 7,865,416 B1 | 1/2011 | Graff |
| 8,392,318 B2 | 3/2013 | Bhat |
| 8,463,697 B1 | 6/2013 | Narayan et al. |
| 8,725,616 B2 | 5/2014 | Schneider |
| 9,459,622 B2 | 10/2016 | Abhyanker |
| 9,494,937 B2 | 11/2016 | Siegel |
| 9,594,373 B2* | 3/2017 | Solyom .............. B60W 60/0011 |
| 10,665,155 B1* | 5/2020 | Rao ........................ B60K 35/28 |
| 2005/0108136 A1 | 5/2005 | Schneider |
| 2006/0271458 A1 | 11/2006 | Arnold et al. |
| 2007/0038533 A1 | 2/2007 | Huff |
| 2009/0177575 A1 | 7/2009 | Hays |
| 2010/0030611 A1 | 2/2010 | Long et al. |
| 2010/0185467 A1 | 7/2010 | Strand, II |
| 2012/0023976 A1* | 2/2012 | Kim ........................ F24F 11/30 62/89 |
| 2013/0185184 A1 | 7/2013 | Hough et al. |
| 2014/0143158 A1 | 5/2014 | Wilson |
| 2015/0199619 A1 | 7/2015 | Ichinose |
| 2016/0027307 A1 | 1/2016 | Abhyanker et al. |
| 2016/0042457 A1 | 2/2016 | Silk et al. |
| 2016/0048919 A1 | 2/2016 | Frischer |
| 2016/0203649 A1 | 7/2016 | Berkobin et al. |
| 2016/0247095 A1 | 8/2016 | Scicluna et al. |
| 2016/0247106 A1 | 8/2016 | Dalloro et al. |
| 2016/0247109 A1 | 8/2016 | Scicluna et al. |
| 2017/0123423 A1* | 5/2017 | Sako .................. G01C 21/3438 |
| 2017/0141873 A1 | 5/2017 | Mandeville-Clarke |
| 2018/0004204 A1* | 1/2018 | Rider ...................... B60K 35/28 |
| 2018/0068355 A1* | 3/2018 | Garry ................... G07C 5/0808 |
| 2018/0186274 A1 | 7/2018 | Gurin |
| 2018/0201148 A1* | 7/2018 | Donnelly ............. G05D 1/0088 |
| 2018/0237086 A1 | 8/2018 | Evans |

OTHER PUBLICATIONS

Dornob, "Driverless Self-Parking (Post) Modern Mobile Home Design" (Oct. 7, 2016) http://dornob.com/driverless-self-parking-postmodern-mobile-home-design/.
Athwal, Nav, "How Crowdfunding Has Changed Real Estate Investing" (Dec. 2, 2015) http://www.forbes.com/sites/navathwal/2015/12/02/how-crowdfunding-has-changed-real-estate-investing#3834b6d518d8.
Athwal, Nav, "A Beginner's Guide to Real Estate Crowdfunding" (Mar. 21, 2016) https://www.landlordology.com/real-estate-crowdfunding/.
realtymogul.com, "Real Estate Crowdfunding—Mobile Home Park Fund" (Sep. 27, 2014) https://www.realtymogul.com/resource-center/articles/realtymogulcom-crowdfunds-another-mobile-home-park-fund.
RVing, "Autonomous RVing" (Date Youtube video published:Apr. 1, 2016) https://www.youtube.com/watch?v=Gt3CU0nL3eY.
Briggman, Salvador, "Top 10 Real Estate Crowdfunding Websites" (Oct. 7, 2016) http://www.crowdcrux.com/top-real-estate-crowdfunding-websites/.
Hurst, Samantha, "RealtyMogul Unveils New Investment Opportunity for Mobile Home Park Fund" (Oct. 1, 2015) https://www.crowdfundinsider.com/2015/10/75203-realtymogul-unveils-new-investment-opportunity-for-mobile-home-park-fund/.
Laylin, Tafline "Apple unveils self-driving mini electric home on wheels" (Apr. 1, 2016) http://inhabitat.com/apple-unveils-self-driving-mini-electric-home-on-wheels/.
Rao, Vittal, "What could the inside of an autonomous personal car that functions as a modern workplace look like?" (Apr. 24, 2015) https://www.quora.com/What-could-the-inside-of-an-autonomous-personal-car-that-functions-as-a-modern-workplace-look-like.
Abhimanyu, Kumar, "How connected cars are turning into revenue-generating machines" (Aug. 28, 2016) https://techcrunch.com/2016/08/28/how-connected-cars-are-turning-into-revenue-generating-machines/.
Gloriast, "Concept Ecocapsule—Autonomous mobile home" (May 26, 2015) http://itechfuture.com/concept-ecocapsule-autonomous-mobile-home/.
Agadoni, Laura, "How to Crowdfund Your Real Estate Purchase" (Dec. 2, 2015) https://www.trulia.com/blog/real-estate-crowdfunding/.
Tams, Harry, "The Castle—Autonomous Mobile Dwelling Unit" (Jan. 1, 2000) http://www.utas.edu.au/science-engineering-technology/schools/accordion/school-of-engineering-and-ict/engineering/areas/architecture-and-design/the-castle-autonomous-mobile-dwelling-unit.
Tully, Jim et al., "Internet of Things Primer for 2016," Mar. 31, 2016, 8 pages.
Velosa, Alfonso, et al., "Hype Cycle for the Internet of Things, 2016," Jul. 14, 2016, 68 pages.
Velosa, Alfonso et al., "Maturity Model for the Internet of Things," Mar. 2, 2016, 18 pages.
Tully, Jim, "IoT: Key Lessons to Date and Action Plan for 2016," Feb. 12, 2016, 8 pages.
Prentice, Stephen, "The Six Forces That Will Shape Business and Technology in 2030," Feb. 1, 2016, 9 pages.
Friedman, Ted et al., "Predicts 2016: Unexpected Implications Arising From the Internet of Things," Dec. 3, 2015, 13 pages.
Cearley, David W. et al., "Top 10 Strategic Technology Trends for 2016," Feb. 29, 2016, 15 pages.
Walker, Mike J. et al., "Top 10 Strategic Technology Trends for 2016: Information of Everything," Feb. 26, 2016, 11 pages.
Plummer, Daryl C. et al., "Top Strategic Predictions for 2016 and Beyond: The Future Is a Digital Thing," Oct. 2, 2015, 27 pages.
Jones, Nick, "Top 10 IoT Technologies for 2017 and 2018," Jan. 22, 2016, 12 pages.
Geschickter, Chet et al., "Measuring the Strategic Value of the Internet of Things for Industries," Apr. 28, 2016, 14 pages.
Furlonger, David et al., "Toolkit: IoT Strategic Technology Map for Financial Services Initiatives," Dec. 2, 2015, 4 pages.
Furlonger, David et al., "Survey Analysis: Financial Services CIOs Should Not Ignore the Internet of Things," Mar. 17, 2015, 17 pages.
Moyer, Kristin R. et al., "Measuring the Strategic Value of Financial Services IoT," Dec. 2, 2015, 10 pages.
Newton, Alistair et al., "Gartner's Digital Banking Customer Advisory Framework, " Jul. 7, 2016, 8 pages.
Moyer, Kristin R., "Industry Vision: Banks as Platforms," Apr. 22, 2016, 11 pages.
Moyer, Kristin R. et al., "Industry Vision: Tipping Point for Banks as Platforms," May 3, 2016, 11 pages.
Moyer, Kristin R., "The Economics of Connections for Banking," Mar. 8, 2016, 12 pages.

(56) References Cited

OTHER PUBLICATIONS

Geschickter, Chet et al., "Survey Analysis: Early Adopters of Internet of Things Poised to Make 2016 the Year of the Customer," Feb. 12, 2016, 15 pages.
Lehong, Hung et al., "Building a Digital Business Technology Platform," Jun. 8, 2016, 21 pages.
Pettersson, Ingrid, et al. "Living room on the move: autonomous vehicles and social experiences." Proceedings of the 9th Nordic Conference on Human-Computer Interaction. 2016 (Year: 2016).

* cited by examiner

400 — window

402 — YOU INDICATED THAT YOU WISH TO PURCHASE A MAU. PLEASE DESCRIBE THE MAU YOU WOULD LIKE TO PURCHASE BASED ON THE FOLLOWING CRITERIA.

404 — OUR DATA INDICATES THAT YOUR NEW MAU WILL SPEND MOST OF THE TIME IN AND AROUND SAN FRANCISCO, CA. IS THAT CORRECT?
YES   NO

406 — HOW WILL YOU BE PAYING FOR THE MAU?

408 — SELF FUNDING 100%   410 — PARTIALLY CROWD FUNDING   412 — OTHER: _____

414 — WHICH OF THE FOLLOWING AMENITIES MUST YOUR MAU COME WITH (SELECT ALL THAT APPLY)?

416 — LIVING SPACE   418 — OFFICE SPACE   420 — SUSTAINABLY POWERED

422 — OTHER: _____

424 — WHICH OF THE FOLLOWING SERVICES WOULD YOU LIKE TO OFFER TO POTENTIAL TENANTS OF YOUR MAU (SELECT ALL THAT APPLY)?

LODGING   WORKSPACE   SOCIAL   RIDESHARE ← 426

OTHER: _____ ← 426

428 — WHICH OF THE FOLLOWING ADDITIONAL REVENUE STREAMS WOULD YOU LIKE AVAILABLE ON YOUR MAU (SELECT ALL THAT APPLY)?

ENERGY   ADVERTISING   COMMUNICATIONS   OTHER: _____ ← 430

442 — APPROXIMATELY WHAT PERCENTAGE OF THE TIME WILL YOU SPEND IN YOUR MAU?

| 85-100% | 60-85% | 40-60% ← 444 |

| 20-40% | 0-20% ← 444 |

446 — WHAT WILL BE THE AVERAGE DURATION OF YOUR TIMES AWAY FROM YOUR MAU?

| < 1 DAY | 1-3 DAYS | 4-7 DAYS ← 448 |

| 8-14 DAYS | >14 DAYS ← 448 |

450 — APPROXIMATELY HOW MANY COMPLETE WEEKENDS EACH YEAR DO YOU EXPECT TO BE AWAY FROM YOUR MAU?

| 2-5 | 5-10 | 10-20 | >20 ← 452 |

FIG. 5B

PURCHASING AND MONETIZING OF MOBILE AUTONOMOUS UNITS

BACKGROUND

Conceptually, a Mobile Autonomous Unit (MAU) is an autonomously driven mobile structure that can be used for, e.g., living, working, traveling, etc. Proliferation of MAU's may occur as physical space on the planet becomes more limited and people become more peripatetic.

SUMMARY

The present disclosure deals with Mobile Autonomous Units (MAU's). The term MAU, as used in this disclosure, refers to a unit that is both "autonomous" and "multi-purpose." By "autonomous" it is meant that the unit can transport itself with little or no human intervention. By "multi-purpose" it is meant that the unit is configured for more than one type use. Non-limiting examples of uses include a transportation vehicle, a workspace for people, a living space for people, an energy generator, etc. Although the MAU's described in this disclosure are presumed to be autonomous and multi-purpose, it should be appreciated that many principles and features of MAU purchasing and monetizing described in the present disclosure could be applied to non-autonomous and/or single purpose units. An example of a non-autonomous and/or single purpose unit is an automobile.

In accordance with certain aspects of the present disclosure, a system is disclosed that is configured to purchase and monetize a MAU. In some examples, the system is configured to value a MAU prior to purchase. In some examples, the system is configured to finance a purchase of a MAU with crowdfunding. In some examples, the system is configured to set up and manage one or more revenue streams associated with a MAU and/or to optimize the revenue streams based on one or more parameters.

An example optimizable revenue stream parameter is use time for the MAU, that is, how much time in a given period the MAU is generating revenue through one or more of its revenue streams. Thus, in some examples, the system is configured to maximize use time (UT) for a given MAU or series of MAU's. Another example optimizable revenue stream parameter is revenue per unit time (RPUT), that is, the amount of revenue per unit time generated by a MAU. In some examples, the system is configured to maximize RPUT for a given MAU or series of MAU's.

Each MAU can have a proprietor and a MAU can switch between proprietors, e.g., through buying and selling. A MAU proprietor can be a person, a group of people, a company or other legal entity that holds an ownership stake in a MAU that carries a right to physically enter and use the MAU and, through the ownership stake, a non-zero amount of control over how the MAU is used, e.g., how it is used to generate revenue. In addition, a MAU proprietor is entitled to at least a portion of revenue generated by that MAU. A given proprietor can be entitled to all revenue from all streams, or some revenue from one or more streams.

A prospective proprietor is any person, group of people, company or other legal entity that seeks to become a proprietor of a MAU. In some examples, prospective proprietors will finance their purchase of a stake in a MAU from one or more non-proprietors, i.e., third parties.

Revenue generated by a MAU can be used by a proprietor to pay off third party investors who have funded the proprietor's MAU stake. Revenue generated by a MAU can also be reinvested by the proprietor in the MAU itself, e.g., to pay for maintenance, renovations, or upgrades to the MAU, which can increase the MAU's value. Revenue generated by the MAU can also be retained by the proprietor as profit and/or delivered to MAU investors as dividends or increased share value on their shares in the MAU.

DESCRIPTION OF THE DRAWINGS

FIG. 5A depicts an example interface display showing an example input screen on a user device of the system of FIG. 2.

FIG. 5B depicts a further example interface display showing an example input screen on a user device of the system of FIG. 2.

DETAILED DESCRIPTION

In the following Detailed Description, reference is made to the accompanying drawings, which form a part hereof, and in which is shown by way of illustration specific embodiments which may be practiced. The following detailed description, therefore, is not to be taken in a limiting sense.

Features of the systems and methods for managing mobile autonomous units disclosed herein can benefit both proprietors of the MAU's and other users of the MAU's and, consequently, the human population as a whole.

The need for MAU's may grow as available space decreases and as the human race proliferates. Dense population centers face significant, and in some cases existential threats from forces such as natural disasters, climate change, overpopulation, war, and so forth. As the population increases, the number of displaced migratory persons is also likely to increase and the concept of a "home" is likely to change, with many people no longer dwelling in a single location.

MAU's offer a solution to these and other problems by providing compact, mobile, spaces suitable for a variety of uses and human needs. Features of the systems and methods of the present disclosure help to optimize MAU usage, in terms of both time, and the physical space the MAU's take up. In addition, features of the systems and methods of the present disclosure facilitate acquisition, transfer and maintenance of MAU's.

Figure 1:
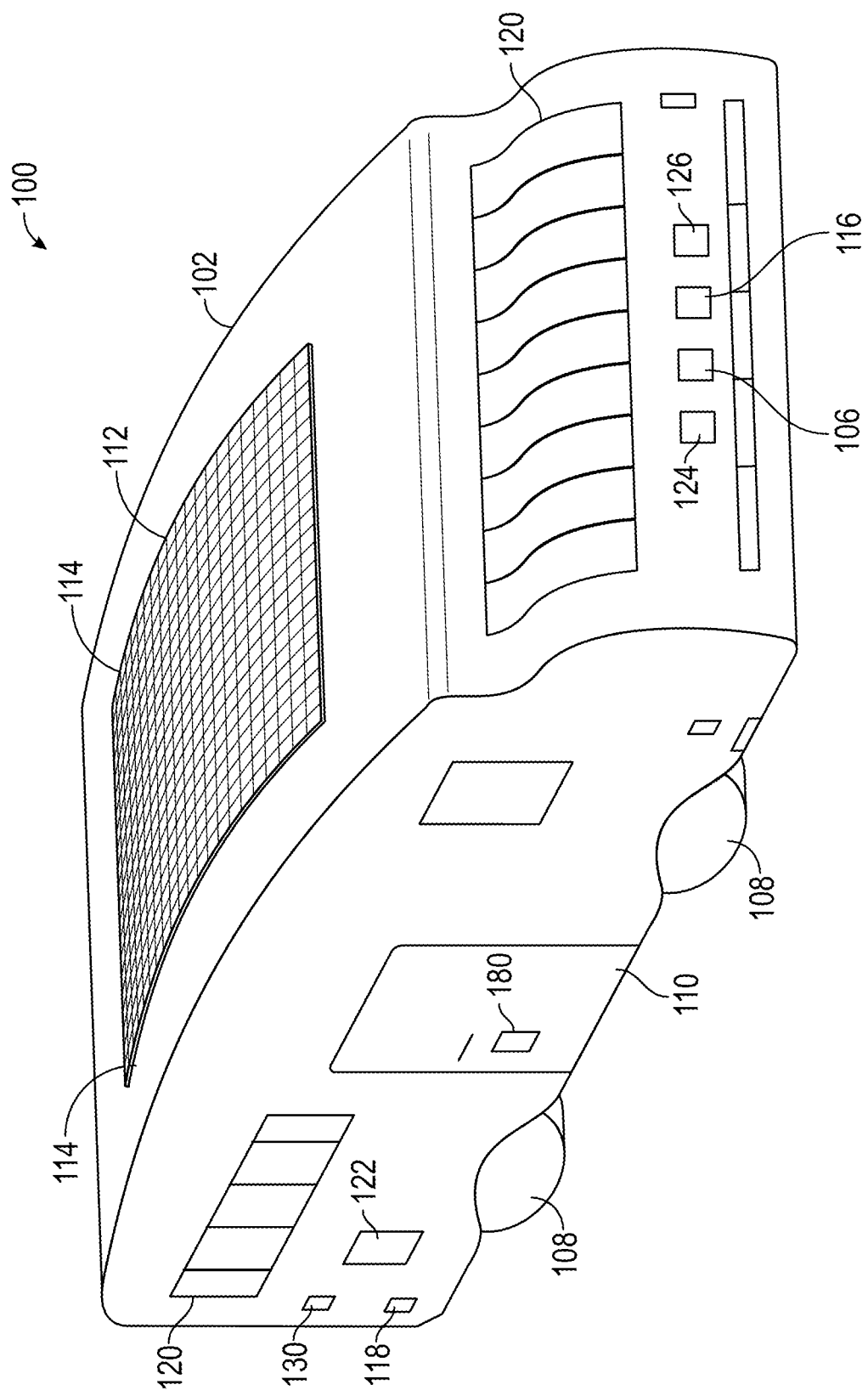
FIG. 1 is a schematic drawing of an example MAU in accordance with aspects of the present disclosure.

FIG. 1 is a schematic drawing of an example MAU 100 in accordance with the present disclosure. The MAU 100 includes an enclosure 102 and a mobility mechanism 104 for mobilizing the MAU. For example, if the MAU is designed for travelling on flat surfaces, the mobility mechanism 104 can include a power supply 106 (e.g., a battery) that powers a motor that drives rotation of one or more wheels 108. The MAU 100 includes an access feature for accessing the interior of the enclosure 102. In the example shown, the access feature is a door 110.

The MAU 100 optionally includes an energy generator 112. In this example, the energy generator is a series of solar panels 114. Other examples of energy generators include, e.g., wind turbines. The energy generator 112 supplies energy to the power supply 106 and thereby recharges the power supply 106 to ensure mobility of the MAU whenever desired. In addition or alternatively, the power supply can be recharged from an external source, e.g., a fueling station. The MAU 100 optionally also includes an energy storage unit 116. The energy storage unit 116 can store surplus energy generated by the energy generator 112. Energy stored by the energy storage unit 116 can be apportioned to the power supply 106 when needed, and/or transferred off the MAU, e.g., to another MAU, a power company, or a power grid.

The interior of the enclosure 102 includes one or more rooms. The rooms can be selected from, e.g., living rooms, bathrooms, kitchens, offices, and so forth. The rooms can have one or more windows 120 to the outside of the MAU. In addition, the same room can serve multiple purposes. For example, a living room can serve as a bedroom and/or an office. The enclosure 102 can include one or more appliances (e.g., stove, oven, dishwasher, washing machine, dryer, television, computer, lighting, air conditioning units, heating units, air filters, etc.) that can be powered by the power supply 106.

The enclosure 102 can also include a plumbing system 118, which can consist of one or more plumbing fixtures, e.g., water tanks, septic tanks, pipes, water pumps, sinks, faucets, showers, etc. In some examples, the plumbing system 118 can be maintained by connecting the plumbing system 118 to, e.g., a water supply and/or a sewage dump external to the MAU.

The MAU 100 also includes a system connectivity unit 122, which can be powered by the power supply 106. The system connectivity unit 122 includes hardware configured to connect the MAU to a MAU management system that will be described in greater detail below. The system connectivity unit 122 can be configured to connect to a MAU via a communications network, e.g., via the Internet. In some examples, the system connectivity unit 122 can also provide communications capabilities to the MAU, such as Internet communications, cellular communications, satellite communications, etc. The system connectivity unit 122 can receive and transmit data from a positioning device 124, which provides location information about the MAU 100. A controller 126 can receive and process instructions sent from a MAU management system and send instructions in the form of signals (such as driving and stopping signals) to various components and systems of the MAU itself.

The positioning device 124 communicates with the system connectivity unit 122. The location of the MAU at any given time can be determined by any appropriate positioning device 124 or system using such a positioning device. Non-limiting examples of such positioning devices and systems include, e.g., global positioning systems and devices, cellular tower triangulation, and Internet of Things (IOT) devices, which can be used to track the MAU based on its proximity to an object with a known location. In some examples, the positioning device locates the MAU based on the MAU's connectivity to a particular Wi-Fi network associated with a known location.

In this example, the MAU 100 also includes a biometrics capturing device 180. The biometrics capturing device 180 can be, e.g., a camera, an eye scanner, a fingerprint scanner, etc., that communicates with the system connectivity unit 122 and thereby the server 202. The biometrics capturing device 180 can be used to collect biometrics information from a person attempting to access the MAU 100. Captured biometrics information can be cross-referenced against stored biometrics information from system proprietors and tenants to verify their identity when seeking to enter the MAU 100.

The system connectivity unit 122 can receive commands from, e.g., the MAU's proprietor and/or the MAU management system 200 (FIG. 2) that cause the MAU 100 to move to a particular location or stop at a particular location. For example, the MAU's proprietor can command the MAU 100 to drive to pick up the proprietor at a particular location, or to go to a maintenance facility to be cleaned or upgraded. In addition, for example, the MAU management system 200 can cause the MAU 100 to pick up a tenant (e.g., a ridesharing passenger) at a particular location and drop off the tenant at another particular location or to drive to a maintenance facility to be cleaned or upgraded following a tenancy.

Figure 2:
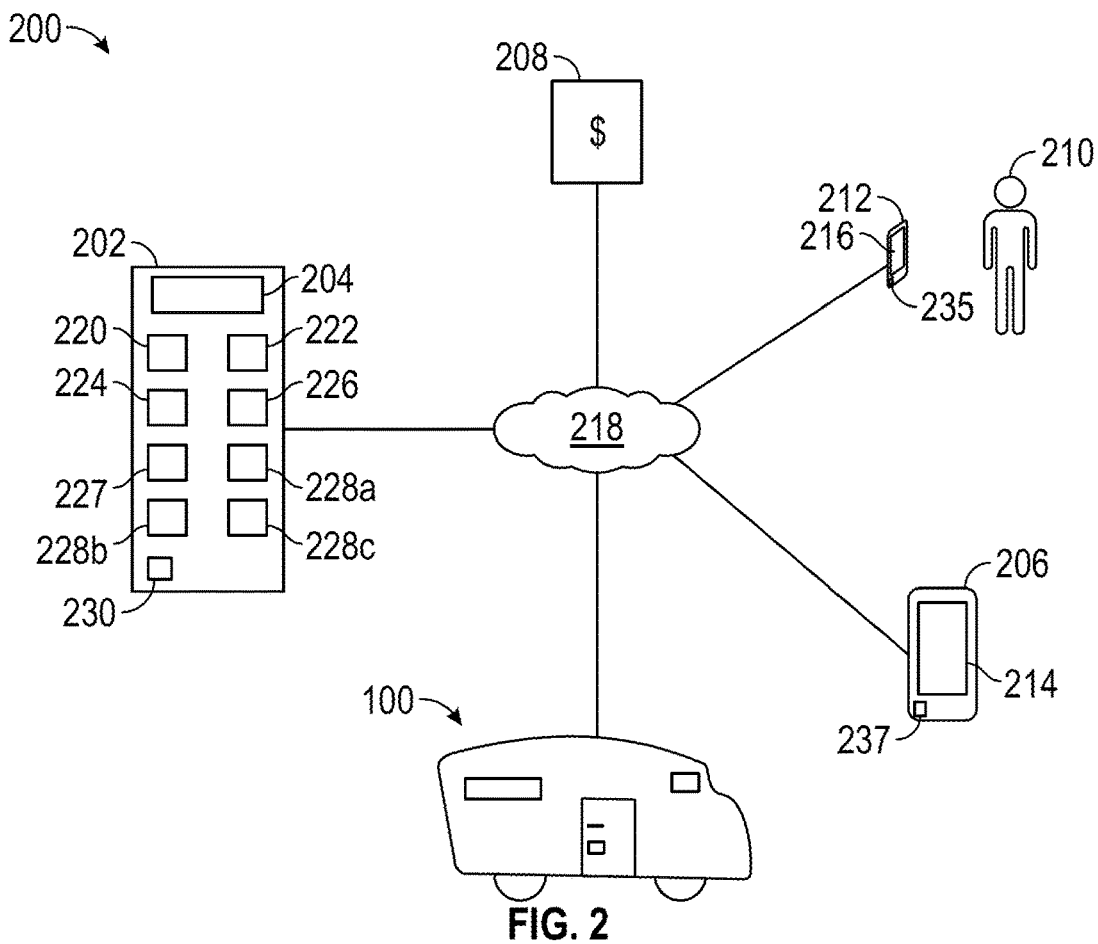
FIG. 2 is a block diagram illustrating an example of a MAU management system in accordance with aspects of the present disclosure, the MAU management system including the MAU of FIG. 1.

FIG. 2 is a block diagram illustrating an example of a MAU management system 200 in accordance with aspects of the present disclosure.

The MAU management system 200 includes at least one MAU, and can include any number of MAU's. For purposes of illustration, in this example the system 200 includes one MAU, which is the MAU 100 of FIG. 1.

In addition, the system 200 includes at least one server 202. In some examples, the server 202 can be one of a network of servers (e.g., a "cloud") of the system 200. In some examples, each server in the network of servers can be adapted to perform a specific function or functions on behalf of the system 200. Although specific functionalities will be attributed to the server 202 in this disclosure, it should be appreciated that the same functionalities can be divided among a network of interconnected servers. Thus, throughout this disclosure, the server 202 can alternatively be understood as a single server or a network of servers.

The server 202 includes one or more computing devices configured to operate together. The server 202 includes one or more databases 204 and one or more modules containing instructions executable by a computer processor, the one or more databases being accessible to the one or more modules. The modules can include, for example, a MAU valuation module 220, a proprietor initiation module 222, a MAU funding module 224, a tenant initiation module 226, a tenant management module 227, one or more MAU revenue modules 228*a*, 228*b*, 228*c*, and a revenue optimizing module 230. It should be appreciated that various functionalities of the MAU management system disclosed herein can be carried out by one or more of the specifically enumerated modules disclosed, or alternatively by other modules of the system that may not be explicitly disclosed but are configured to carry out the disclosed functionality.

The system 200 further includes at least one proprietor device 206 associated with a proprietor or prospective proprietor of the MAU 100.

The system 200 further optionally includes a funding source 208.

The system 200 further includes at least one tenant 210, having a tenant device 212. The system 200 will typically have a plurality of tenants, each with their own tenant device. A tenant is any non-proprietor of a MAU who pays or seeks to pay money to a proprietor of a MAU for use of the MAU. Examples of MAU uses include transportation, living space, work space, storage space, recreational space, advertising space, energy generation, etc. A tenant can be a person, a group of people, a company, or other legal entity.

The proprietor device 206 and the tenant device 212 can be any device adapted to connect the user to interact with other components of the system 200. Non-limiting examples of devices (206, 212) include computing systems such as smart phones, tablets, cell phones, computers, wearable communications devices such as watches, IOT (internet of things) devices, and so forth.

The devices (206, 212) facilitate communication, transactions and/or potential transactions between a proprietor or prospective proprietor or tenant and other parts of the system 200. The device 206 can be linked to a financial account of the proprietor/prospective proprietor (e.g., a credit card account, a checking account, a savings account, an investment account) for purposes of, e.g., receiving payments from tenants and buying and paying costs associated with the MAU 100. The device 212 can be linked to a financial account of the tenant (e.g., a credit card account, a checking account, a savings account, an investment account) for purposes of, e.g., paying for the tenant's use of the MAU 100. For simplicity, the collective group of proprietors, prospective proprietors and tenants of the system 200 will be referred to herein as "users" and a member of that group will be referred to herein as a "user."

In some examples, the user devices (206, 212) each include a user interface (214, 216) respectively. The user interface (214, 216) provides an interacting platform between the user and the system 200. The user interface (214, 216) can provide output provided by, and/or receive input required by, the system's various program modules. The user interface (214, 216) can include any suitable medium for input and output of information, including but not limited to one or more of a touch/display screen, a voice command interface, a keyboard, a mouse, etc. For purposes of illustration, the user devices (206, 212) will be presumed to have a graphical user interface for displaying information, as depicted in some of the figures.

The various components of the system 200, as well as components outside of the system 200 that are accessed by the system, e.g., a server/database of a financial institution that manages a financial account of a user, or a server/database associated with the funding source 208, interact via a data communication network ("network") 218, e.g., the Internet. Additionally, in some examples, the various interactive components inside and outside of the system 200 can interact via one or more application program interfaces (API).

The user devices (206, 212) each include a positioning device (237, 235), respectively, that communicates with the system 200 via the network 218. The location of the user device (206, 212) at any given time can be determined by any appropriate positioning device (237, 235) or system using such a positioning device. Non-limiting examples of such positioning devices and systems include, e.g., global positioning systems and devices, cellular tower triangulation, and Internet of Things (IOT) devices, which can be used to track the user device based on its proximity to an object with a known location. In some examples, the positioning device locates the user device based on the user device's connectivity to a particular Wi-Fi network associated with a known location.

The database 204 can be a single database or a network of databases and, for purposes of this disclosure, can be either. The database 204 or network of databases, in combination with any third party databases, are readable and writable repositories of data required by the system 200 to provide MAU management functionalities in accordance with principles of the present disclosure. Thus, the database(s) store(s) data used by the system 200. Examples of data used by the system 200 include data about users, such as contact information, biometric identifying information, financial account information, personal information (e.g., gender, age, income, education, profession, typical geographic region in which they are present); and data concerning attributes of the MAU's in the system, e.g., date of manufacture, services available for use by tenants, internal system status, valuation, typical geographic region, accident or incident history, floor plan, proprietorship, etc.

A MAU's typical geographic region will be referred to herein as its home region. Home regions can be predefined geographical regions, e.g., a nation, a state, a cluster of states, a city, a cluster of cities, etc. For a given MAU, a home region can be defined as a geographic region in which the MAU spends at least a threshold percentage of time, e.g., at least 51% of the time, or a geographic region in which the MAU spends the most time. In some examples, MAU's can have multiple home regions, or primary, secondary, tertiary, etc., home regions, depending on the percentage of time spent in each region.

The MAU valuation module 220 is configured to value a MAU at a given point in time. A valuation can occur in response to a request, e.g., a request from a proprietor or prospective proprietor submitted to the server 202 via the device 206. A valuation can also occur periodically at preset intervals (e.g., once a month), or in response to the occurrence of a predefined event, such as the introduction of another MAU to the MAU's home region.

The MAU valuation module 220 can value a MAU based on one or more factors. Examples of factors include age, physical size, number and types of uses (e.g., living space, work space, energy generator, etc.), use time, revenue per unit time, etc.

Another example valuation factor is the MAU's home region (or expected home region if the MAU is new to the market). As with conventional real estate markets, a MAU's appraisal can depend on its physical location and basic economic principles of supply and demand for the uses provided by the MAU. For example, a MAU with a home region that includes a major metropolis could, all else equal, have a higher valuation than a MAU with a rural home region.

The MAU valuation module 220 is configured to value a MAU based on all relevant factors, in some examples weighting each factor in accordance with a predefined algorithm. A MAU's valuation as calculated by the MAU valuation module 220 can be considered when buying and selling the MAU's in the MAU marketplace.

The proprietor initiation module 222 is configured to initiate a prospective proprietor to the system 200. The proprietor initiation module processes information from a prospective proprietor of the system 200 and ensures that sufficient information has been provided. Such information can include user identifying information, such as name, address, date of birth, and also permissions for the system to access other information about the prospective proprietor, such as permissions to access information regarding the prospective proprietor's financial accounts, government records, credit scores etc. If insufficient information or permissions have been provided, the proprietor initiation module can cause the system 200 to prompt the prospective proprietor for more information or permissions. In some examples, the initiation module 222 can perform one or more functions to verify the information provided by the prospective proprietor.

Once sufficient information and permissions in connection with a prospective proprietor have been received by the system 200 (and, in some examples, verified), the proprietor initiation module 222 initiates the prospective proprietor as a user of the system 200, enabling the prospective proprietor to view MAU listings for buying and selling MAU's and also execute transactions involving the buying and selling of MAU's.

Proprietor initiation can carry an associated fee for the new user, a periodic subscription fee, or alternatively be free of charge. In some examples, the proprietor initiation module 222 links the system 200 to one or more financial accounts of the new user. Permissions can be set by the new user via the proprietor initiation module 222 to allow the system 200 to debit funds from and credit funds to the new user's linked financial account(s) when making a transaction on the system 200.

In some examples, a prospective or existing user (whether a proprietor or tenant) of the system 200 downloads and installs a software application on their device (206, 212) that electronically links the device to the system 200. Once installed on the device (206, 212), the software application can enable a prospective user to initiate a new account with the system 200, and an existing user to connect to and use the system 200 for MAU proprietorship and/or tenancy purposes. In some examples, access to a user's account on the system 200 requires logging in with credentials to verify the user's identity and authorization to use the account in question.

A prospective proprietor submits a request to the server 202 to purchase all or a portion of a MAU. In some examples the prospective proprietor expressly identifies the MAU they wish to purchase. In other examples, the MAU funding module 224 prompts the prospective proprietor to provide one or more requirements for a MAU that they might wish to purchase and then, based on data sorted in the database 204, the funding module 224 generates a list of one or more (or zero) selectable MAU's observable via the device 206 that meet the submitted requirements. In some examples, the funding module 224 can provide detailed information about each MAU that meets the prospective proprietor's requirements. Requirements can include, for example, a maximum/minimum price, a maximum/minimum ownership stake, a home region, available uses, etc.

Once the prospective proprietor selects a MAU to purchase, the funding module 224 is configured to prompt the user to select options for funding the purchase. Such options can include, for example, self-funding in which the prospective proprietor pays the entire balance of the purchase upfront from their own funds, or financed funding, in which all or a portion of the purchase price is borrowed.

The funding module 224 can be configured to offer any of a number of suitable financing structures to the prospective purchaser via the funding source 208. For a given prospective purchaser, the available financing structures can depend on different factors, such as the prospective purchaser's credit history. The funding source 208 can pull funds from inside or outside the system 200. An example of an inside fund provider is another proprietor of the system 200. In addition, in some examples an owner of the system 200 itself can loan funds to a prospective proprietor of a MAU within the system. An example of an outside fund provider is a third party bank.

One example financing structure (or financing platform) is crowdfunding, in which the funding source 208 pools together relatively small amounts of money from each of a relatively large number of MAU investors (referred to as "crowdfunders"). The MAU investors can be inside the system 200, e.g., other proprietors, existing tenants, or outside the system 200, e.g., prospective tenants.

MAU's can offer a uniquely incentivized crowdfunding platform to encourage investment in a prospective proprietor's purchase of a MAU. For example, the introduction of a new MAU into a geographic region can be beneficial to the proprietor of the MAU, prospective tenants of the MAU, and the region as a whole. Prospective tenants may appreciate the greater supply of MAU's in their area, which can reduce MAU tenancy prices or facilitate the finding of an available MAU when desired. At the same time, more MAU's in a given region can help to attract more people to that region, benefitting the region as a whole.

In addition, MAU's, like houses, can appreciate in value as demand for MAU's increases, as the services provided by the MAU's are upgraded, and so forth. A MAU investor's shares in a MAU can receive dividends, e.g., from revenue generated by the MAU through tenancy or other revenue streams or from the MAU's overall appreciation. Thus, "crowds" can be incentivized to fund the purchase of a new MAU to their area, and the funding module 224 can be configured to solicit funds from such a crowd to finance a prospective proprietor's MAU purchase.

For example, the funding module 224 can be configured to generate, based on instructions from a prospective proprietor, a crowdfunding site (e.g., a webpage) in order to assist the prospective proprietor in purchasing a MAU. The crowdfunding site can be interactive and allow the prospective proprietor to present information about the MAU for potential investors who can invest via the site. Such presented information can include, for example, the MAU's model and manufacturer (optionally including one or more links to additional information about the MAU provided, e.g., on the manufacturer's website), the MAU's home area, the prospective proprietor's approximate occupancy schedule for the MAU (i.e., how much time the proprietor will spend away from the MAU), the projected future value of the MAU (e.g., based on value trends in similarly situated MAU's), what dividends investors can expect to receive from investing in the MAU, the projected costs for running and maintaining the MAU and how costs will be allocated between the proprietor and the investors (given, e.g., the home region and the expected amount and types of tenancy), how much the proprietor is self-funding the purchase of the MAU and how much the proprietor is looking to finance through outside investment, and how many shares will be issued.

The information provided on the crowd funding site can be input to the system 200 directly by the prospective proprietor and/or gleaned by the system from one or more third party sources of relevant information. For example, the home region for the MMAU can be provided directly by the prospective proprietor and/or, if the prospective proprietor permits it, gleaned by the proprietor initiation module 222 based on e.g., data relating to the prospective proprietor's typical location and movement patterns. Similarly, projected costs for running and maintaining the MAU can be provided directly by the prospective proprietor and/or, if permitted by the prospective proprietor, gleaned by the proprietor initiation module 222 based on the prospective proprietor's past usage of MAU's in the system 200.

Based on the information provided on the crowdfunding site, the funding module 224 can be, in some examples, configured to use predictive analytics to calculate a value creation and equity curve for the MAU in question, in order to assist potential crowd funders to invest in the MAU, and to calculate the value of the shares on offer to the crowd funders.

The MAU funding module 224 can draw from the funding source 208 and, e.g., transfer those funds to the MAU seller to complete the sale of the MAU to a prospective proprietor who, upon closing of the sale, becomes a proprietor of the MAU in question.

In some examples, the system 200 provides for a MAU equity marketplace in which proprietors and investors can trade, sell, and/or buy shares in one or MAU's managed by the system 200. It should be appreciated that, as part of a MAU marketplace, a proprietor can elect to buy out the other investors in their MAU. It should also be appreciated that investors can be categorized in different tiers, and can carry different levels of control over and access to a MAU. For example, certain shareholders can be allowed physical access to and use of the MAU, e.g., as timeshare arrangement with other investors, effectively becoming a co-proprietor of that MAU. Other shareholders may be prohibited from physically accessing the MAU but allotted a certain degree of control over managing the MAU and its revenue streams. Other shareholders may have no control over management of the MAU.

The tenant initiation module 226 is configured to initiate a prospective tenant to the system 200. The tenant initiation module 226 processes information from a prospective tenant of the system and ensures that sufficient information has been provided. Such information can include, e.g., user identifying information, such as name, address, date of birth, and also permissions for the system to access other information about the prospective tenant, such as permissions to access information regarding the prospective tenant's financial accounts, government records, credit scores, etc. If insufficient information or permissions have been provided, the tenant initiation module 226 can cause the system 200 to prompt the prospective tenant for more information or permissions. In some examples, the tenant initiation module 226 can perform one or more functions to verify the information provided by the prospective tenant.

Once sufficient information and permissions in connection with a prospective tenant have been received by the system 200 (and, in some examples, verified), the tenant initiation module 226 initiates the prospective tenant as a user of the system 200, enabling the prospective tenant to view MAU listings for tenancy uses, such as lodging, transportation, office space, etc., and also execute transactions involving tenancy uses of the MAU's.

Tenant initiation can carry an associated fee for the new user, a periodic subscription fee, or alternatively be free of charge. In some examples, the tenant initiation module 226 links the system 200 to one or more financial accounts of the new user. Permissions can be set by the new user via the tenant initiation module 226 to allow the system 200 to debit funds from and credit funds to the new user's linked financial account(s) when making a transaction on the system 200.

In some examples, a user of the system 200 logs into their user account to search for a MAU tenancy. Once logged in, in some examples, the prospective tenant can then perform a search for the desired tenancy. The search can be general, highly tailored, or somewhere in between. An example of a relatively general search is for any available MAU's in the prospective tenant's geographical area that are expected to be open for tenancy at some point in time. An example of a more specific search is for MAU's that are available for a particular purpose (e.g., a rideshare) at a particular time (e.g., as soon as possible) for a particular trip (from point A to point B) for no more than a maximum price (e.g., $30). The tenant management module 227 retrieves attribute information about MAU's from the database 204 in accordance with any search criteria entered by the prospective tenant and transmits information about MAU's that meet the criteria to the user device 212.

Once the prospective tenant selects a MAU option for their tenancy, in some examples the tenant management module 227 is configured to coordinate the actuation of the tenancy, e.g., by causing the selected MAU to travel to the tenant's location or to inform the tenant of a time and place for the MAU and tenant to meet. In some examples, the tenant management module 227 is configured to also facilitate termination of any tenancy, e.g., by notifying the tenant that their tenancy has terminated.

In some examples, the tenant management module 227 is configured to ensure that there are no overlapping tenancies for the same block of time for a MAU. For example, the tenant management module 227 can ensure that there are not two separate tenants who have booked the same MAU for lodging on the same night. The tenant management module 227 can also ensure that a tenancy and proprietor's planned use of a MAU do not conflict. In some cases, this may require some sort of negotiation between the tenant and the proprietor which can be coordinated by the tenant management module 227. For example, a proprietor whose plans have changed such they need to be present in their MAU at a time that has already been booked for a tenant may first have to agree to refund or discount the price of the tenancy and/or to find substitute accommodation for the tenant via the tenant management module 227.

Although certain types of tenancies may not logically overlap (e.g., using a MAU with one bathroom as a lodging for one tenant and simultaneously as an office space for another tenant), it should be appreciated that, in some examples, a single MAU can be used for multiple forms of tenancy at the same time. For example, a MAU can be used as a rideshare for one or more tenants at the same time that it is being used as an office space, provided that the internal structure of the MAU provides sufficient privacy for the office space tenant. Using a MAU for multiple simultaneous tenancies can improve the MAU's UT and RPUT.

The MAU revenue modules (228a, 228b, 228c, etc.) are coordinated to manage revenue from different revenue streams for each MAU in the system 200. Revenue streams can generally fall under two categories—tenant driven revenue (TDR) and unit driven revenue (UDR).

TDR is revenue generated by a MAU from tenant usage of the MAU, such as for rides, office space, lodging, and so forth. Typically, when a proprietor is occupying the MAU, tenants are excluded from the MAU and the MAU generates no TDR.

UDR is revenue generated by the MAU itself. For example, a MAU that has solar panels or wind turbines that generate surplus energy (energy beyond that needed to operate the MAU) can sell that energy to a power company or to a municipal power grid. Thus, whenever the MAU is generating surplus energy that MAU has an active UDR stream.

Another example UDR revenue stream is mobile advertising, e.g., advertisements placed on the MAU that are observable outside the MAU. Third parties can pay for advertising space on a MAU via a UDR revenue module.

Another example UDR revenue stream is the sale of space on the MAU to accommodate a third party's physical (non-human) object, e.g., a communications device. For example, a communications company can pay the proprietor of a MAU to carry a transponder on the MAU at all times to help improve the company's communications system in the MAU's home region.

The revenue modules (228a, 228b, 228c, etc.) are, for each MAU, configured to ensure payment by tenants and third parties for all of their uses of the MAU. Different payment arrangements can be used depending on the type of revenue stream (UDR, TDR), the particular MAU/proprietor and/or the particular tenant/third party. For example, an advertising company may pay the proprietor of a MAU via one of the revenue modules for three weeks of advertising in advance. A ridesharing tenant may pay the proprietor of a MAU via one of the revenue modules once the rideshare is complete and the tenant has arrived at their destination. A power company may pay the proprietor of a MAU via one of the revenue modules on a monthly basis in accordance without the amount of power actually transferred by the MAU.

The revenue modules (228a, 228b, 228c, etc.) are configured to work with the revenue optimizing module 230 and also the system connectivity unit 122. Using information provided by the revenue modules, third party sources accessible by the server 202 (e.g., social media blogs, weather forecasts, etc.), and the system connectivity unit (which provides information about individual MAU's), the revenue optimizing module is configured to maximize revenue generation by a MAU within one or more predefined parameters. The predefined parameters can be set and/or modified by the system 200 and/or by the individual MAU proprietor(s).

Optimization can be performed by the optimizing module 230 continuously, at preset intervals, upon request by an authorized user of the system 200 (e.g., a proprietor) or in response to a new or modified parameter. Each MAU in the system 200 can have its own set of revenue optimizing parameters; however, some parameters can apply to a plurality of MAU's.

An example parameter relevant to revenue optimization for a given MAU is the proprietor's usage of the MAU. When the proprietor is using the MAU, for example, TDR is unavailable. Another example parameter relevant to revenue optimization for a given MAU is the MAU's home region. In addition to evaluating present or future parameters relevant to revenue optimization, in optimizing revenue the revenue optimizing module 230 can also collect and process data relating to past revenue results. Past results can include, for example, past revenue actually generated previously by the same or a similar MAU as the one in question carrying the same or similar parameters as the MAU in question.

As an illustrative example of how the revenue optimizing module 230 can optimize the parameters of proprietor usage and home region for a given MAU X, the MAU X's proprietor uses the MAU X on every weekday except Thursday, the proprietor returning early Friday morning and leaving midday Friday for the weekend. In this example, the MAU X's home region Y is in a rural area not associated with a large city or a metropolis. Based on past revenue data supplied by the revenue modules (228a, 228b, 228c), the revenue optimizing module 230 determines that few people use MAU's in region Y for rideshares on weekdays and calculates a projected Thursday revenue from rideshares for MAU X based on such past revenue data.

The MAU can also process information relevant to revenue parameters from other sources, such as third party sources. For example, via the network 218, the server 202 accesses a third party database (e.g., a municipal website or a social media blog associated with the region Y) to determine if any particular Thursday could present an exception to the average past data. For example, a popular college football game that takes place once a year in region Y could boost the chances of generating substantial revenue from MAU rideshares on that day within region Y.

Thus, it should be appreciated that the revenue optimizing module 230 can generate the composite probable revenue for each given revenue stream (if activated) in a given period of time in the future, the composite probable revenue being based on past data and future projected parameters present for the time period in question. Based on the composite probability for each revenue stream, the revenue optimizing module 230 is configured to optimize those revenue streams for the period of time in question, e.g., by activating one of the revenue streams for the entire time period, activating a plurality of revenue streams at non-overlapping times during the time period, and/or activating a plurality of revenue streams at overlapping times during the time period, to the extent the MAU can accommodate the simultaneous revenue streams.

In the illustrated example, the revenue optimizing module 230 calculates a relatively low probability of substantial revenue generation from activating MAU X as a ridesharing vehicle on the Thursday in question. In addition, the revenue optimizing module 230 processes information provided by a third party source regarding weather predictions in and around region Y on the Thursday in question and identifies a particular area just outside region Y that is predicted to experience direct sunlight for at least seven hours on that Thursday.

In addition, the revenue optimizing module 230 processes MAU attribute information from the database 204 indicating that the MAU X generates power through solar panels and has an energy storage unit and hardware for transferring energy from the energy storage unit off of the MAU. In addition, the revenue optimizing module 230 processes information provided by a third party social media blog associated with the region Y indicating that the region Y will be hosting a music festival Saturday and Sunday (the weekend immediately following the Thursday in question). Based on at least the foregoing data and information, the revenue optimizing module activates an energy provision revenue module for the Thursday in question, causes the system 200 to consider the MAU X unavailable for tenancy on the Thursday in question (and therefore unavailable when searched for by prospective tenants), and causes the MAU X, via the system connectivity module in the MAU X to travel to the aforementioned sunny area during the daylight hours on Thursday and/or after the proprietor has departed the MAU X on Thursday morning.

In addition, aware of the proprietor's anticipated absence from the MAU X during the Friday afternoon, Saturday and Sunday immediately following the Thursday in question, the revenue optimizing module 230 activates the lodging revenue module for Friday night and Saturday night, causing the system 200 to indicate to potential lodging tenants that the MAU X is available on those nights. If tenants book the MAU X for lodging over the weekend, the revenue optimizing module 230 can cause the MAU X to position itself in a convenient location for the tenant. If lodging tenants are not found for Friday night and Saturday night by a predefined cutoff (e.g., Friday at 10 o'clock am), the revenue optimizing module 230 can be configured to seek alternative revenue sources for MAU X while the proprietor is absent over the weekend, such as through rideshares and/or energy generation.

The revenue optimizing module 230 can be configured to schedule sufficient "reset" time between tenancy and occupation by a proprietor. For example, the revenue optimizing module 230 can be configured to cause the MAU X, via the system connectivity unit 122, to travel to a third party cleaning/maintenance facility after the lodging tenants leave and before the proprietor is scheduled to re-occupy the MAU X.

Figure 3:
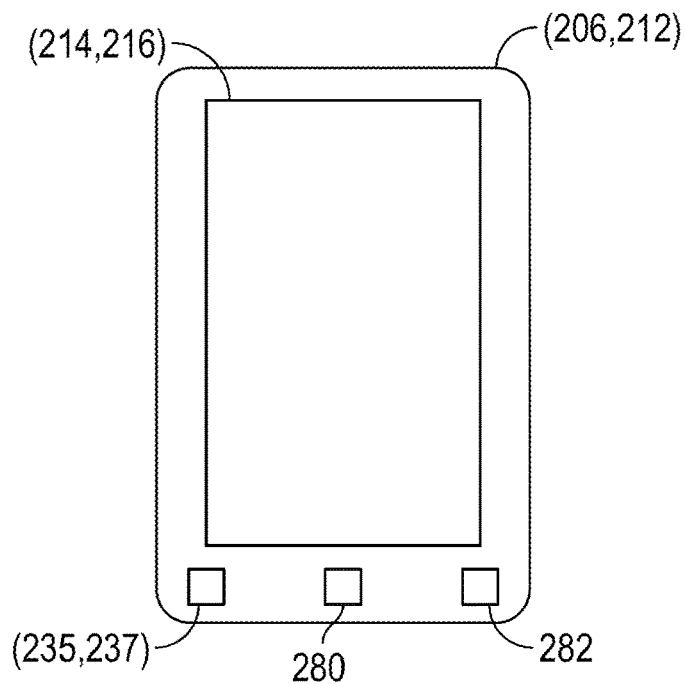
FIG. 3 is a block diagram illustrating more details of an example user device that can be used in the system of FIG. 2.

FIG. 3 is a block diagram illustrating more details of the example user device (206, 212) that can be used in the system 200 of FIG. 2. In this example, the user device (206, 212) includes the user interface (214, 216) and the positioning device (237, 235) as described above. In this example, the user device (206, 212) also includes a plurality of input devices 280, 282.

The user interface (214, 216) allows the user to interface with the system 200, e.g., to set up an account, log into or log out of an account (e.g., a tenant account or a proprietor account), input information, search for, request, and pay for MAU tenancies, search for and fund MAU proprietorships, enter or modify settings and parameters related to MAU tenancies, proprietor occupancy schedules and MAU revenue generation, receive notifications about MAU tenancies and proprietorships, and so forth.

In some examples, one or more features of the system 200 become available to a user only when enabled by that user. For example, a user may have to open and/or login to a system account through a particular software application residing on the user device (206, 212) in order to manage MAU tenancies or proprietorships or otherwise interact with the system 200.

The input device 280 allows the user to input information or instructions that can be sent to the system 200 via the network 218. For example, the input device 280 can be a touch user interface display screen, a voice command interface, a keyboard, a mouse, etc. The input device 282 is a biometric input device configured to enter user identifying biometric information and submit that information to the system 200. Thus, the input device 282 could include one or more of, e.g., a camera, a fingerprint scanner, an eye scanner, etc.

Figure 4A:
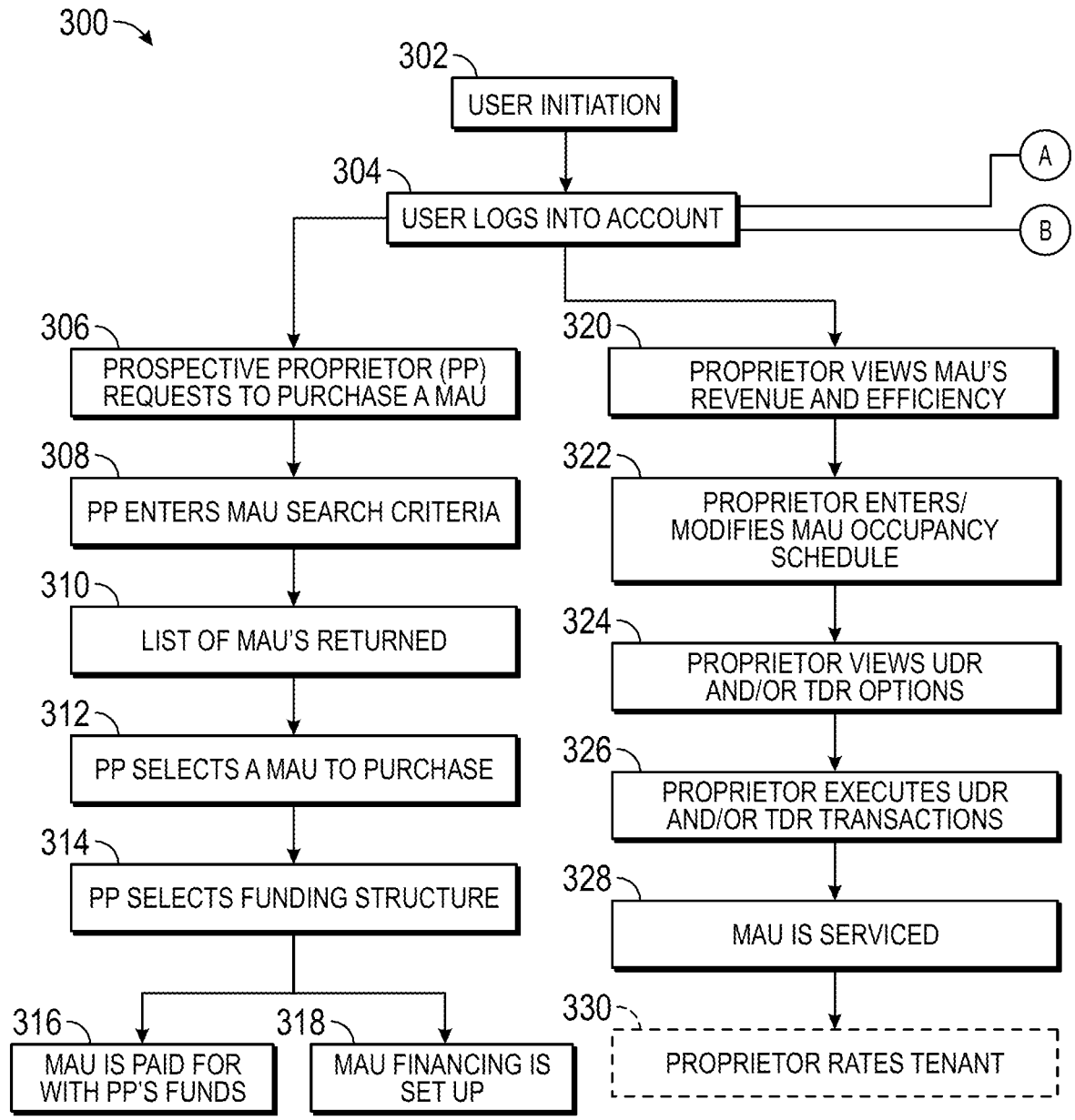
FIG. 4A is a portion of a flow diagram illustrating an example of a process of using the system of FIG. 2.
Figure 4B:
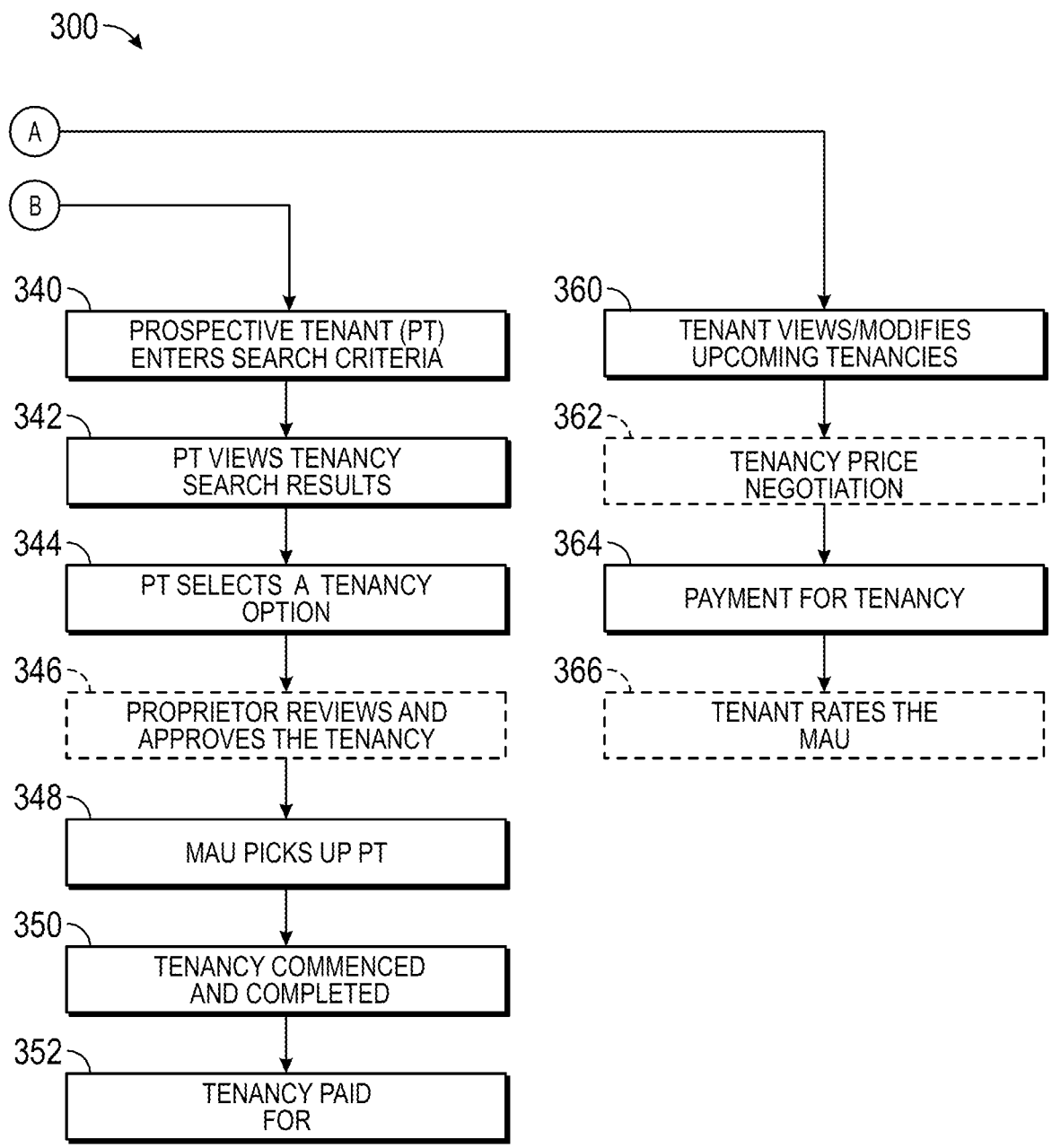
FIG. 4B is a further portion of the flow diagram of FIG. 4A.

FIG. 4A and FIG. 4B (collectively referred to as FIG. 4) are of a flow diagram illustrating an example of a process 300 of using the system 200 of FIG. 2 for four different types of users of the system 200.

In a step 302, a prospective user (a prospective proprietor or a prospective tenant) connects to the server 202 of the system 200, e.g., by downloading a software application onto their user device (206, 212) and setting up a user account with the system 200 via the initiation module 222, establishing settings, permissions, etc. Authentication credentials, e.g., a login name and password, security questions and answers, biometrics information, etc., can be established to mitigate the chances of unauthorized access to the system 200 through the user's account. The user account is linked to at least one financial account of the user (e.g., a credit card account or bank account). As part of the step 302, the user can set permissions that link/provide access of the server 202 to one or more information sources, e.g., the positioning device on the user device, a financial account of the user, etc.

In addition, the user can create a profile that describes how they intend to use the system, i.e., as a proprietor, a tenant or both. Proprietor profiles can include information supplied by the user related to their desired proprietorship(s), e.g., the number of MAU's they would like to purchase, the amount of ownership stake in each MAU, the home region of each MAU, the types of revenue streams available on each MAU, which revenue streams can be activated (e.g., UDR but not TDR), the purchase price of each MAU, the user's occupancy schedule for each MAU, etc. Tenant profiles can include information supplied by the user related to the types of their anticipated tenancies, the geographic regions of their anticipated tenancies, and their anticipated tenancy schedule.

In a step 304 the user logs into their user account via the user device (206, 212).

If the user is a prospective proprietor, in a step 306 the prospective proprietor submits a request to purchase a MAU.

In a step 308, the prospective proprietor enters search criteria.

In a step 310 the server 202 returns a list of MAU's that meet the search criteria.

In a step 312, the prospective proprietor selects a MAU to purchase.

In a step 314, the prospective proprietor selects a funding structure for the MAU purchase.

If the prospective proprietor is self-funding the entire purchase price, in a step 316 the MAU is purchased by debiting funds from one or more financial accounts of the prospective proprietor, and the prospective proprietor becomes a proprietor.

If the prospective proprietor is financing the MAU purchase (e.g., through crowdfunding), in a step 318 financing is put in place, e.g., by locating creditors and/or investors and completing agreements with them to fund or partially fund the MAU purchase by the prospective proprietor.

If the user is a proprietor, in a step 320 the proprietor can view (e.g., via the user device 206) a breakdown of revenue generated by their MAU. For each MAU owned by the proprietor, the revenue can be broken down by, e.g., time (i.e., when the revenue was generated), amount, and type (e.g., UDR or TDR, and sub-classifications within those categories).

In some examples, the proprietor can also view a revenue efficiency meter, which shows how efficient the MAU's revenue generation has been for the amount of time the MAU has not been occupied by the proprietor. Efficiency can be shown for all time (i.e., since the MAU was acquired by the proprietor) and/or for a specific period of time.

In a step 322, the proprietor has the option of supplying to the system 200 or modifying their MAU occupancy schedule for a specific period of time into the future, e.g., the next month.

In a step 324, a proprietor who has not permitted the system 200 to automatically optimize revenue streams for their MAU and automatically execute tenancy and other transactions accordingly, has the option of executing one or more UDR transactions and/or TDR transactions. For example, the proprietor can be prompted to decide whether or not to sell $100 worth of surplus solar-generated energy to the local power plant, or whether to sell advertising space on their MAU to a fast food restaurant for $1,000 for two weeks, or whether to rent out the MAU as a lodging to tenants on the six days in the following month in which the proprietor will not be occupying the MAU.

In a step 326, one or more UDR and/or TDR transactions are executed.

In a step 328, the system automatically services (e.g., cleans, tunes, upgrades) the proprietor's MAU or receives and executes instructions from the proprietor to do so.

In an optional step 330, the proprietor rates and/or provides comments to the system 200 about the quality of their tenant and/or their tenancy at the MAU, which can be reviewable by other users of the system 200.

If the user is a prospective tenant, in a step 340 the prospective tenant enters search criteria (e.g., via the user device 212) for a desired tenancy, such as geographic region, timing, pricing, and type of tenancy.

In a step 342, the system 200 presents the prospective tenant with one or more selectable MAU tenancies that match the search criteria.

In a step 344, the prospective tenant selects one of the selectable options.

In an optional step 346, the proprietor of the selected MAU reviews and approves the requested tenancy.

In a step 348, the MAU locates the prospective tenant and picks up the prospective tenant, in some examples verifying the identity of the prospective tenant prior to allowing them entry into the MAU, e.g., through biometrics verification.

In a step 350, the prospective tenant (now a tenant) commences and then completes their tenancy in the MAU and vacates the MAU. In a step 352 (which can occur at any time), payment for the tenancy from the tenant is performed.

If the user is an existing tenant, in a step 360 the tenant can view and/or modify upcoming tenancies.

In an optional step 362, the tenant can negotiate a tenancy price, either with the proprietor via the system 200 or directly with the system itself which is pre-configured to negotiate in accordance with pre-defined guidelines.

In a step 364, the tenant can pay for a tenancy that is ongoing, complete, or forthcoming.

In an optional step 366, the tenant rates and/or provides comments to the system 200 about the quality of their tenancy and the MAU, which can be reviewable by other users of the system 200.

It should be appreciated that that not all of the example steps provided in the example process 300 need to be performed to take advantage of the system 200.

FIG. 5A depicts an example user interface display 400 showing an example user input screen on the user interface 214 of the prospective proprietor device 206 of FIG. 2. This user interface display 400 can be displayed to the user on the user device 206 in conjunction with the process 300 described above. In some examples, this display is generated when the process 300 utilizes the steps 308 and 314.

The user interface display 400 is directed to a prospective MAU proprietor who has submitted a request to the system 200 to purchase a MAU.

The user interface display 400 includes a notification and prompt 402 seeking input from the prospective proprietor regarding the sought after MAU. The information provided by the prospective proprietor via the interface display 400 can help the system identify suitable MAU's for the prospective proprietor, value them, and also find potential sources of funding if the prospective proprietor elects to finance all or a portion of the purchase. The notification 404 asks the prospective proprietor to confirm the home region for the sought after MAU, the system presuming the home region (in this case, San Francisco, CA) based on information collected about the prospective proprietor's location tendencies.

The prompt 406 invites the prospective proprietor to select one of the payment options (408, 410, 412). The payment option 412 is a user-definable option.

The prompt 414 invites the prospective proprietor to select one or more amenities or attributes to be provided by the sought after MAU. Selectable options (416, 418, 420 and a user definable option 422) follow the prompt 414. The amenities/attributes can be related to the MAU's available revenue streams.

The prompt 424 invites the prospective proprietor to identify which tenant services they intend to offer to tenants of the sought after MAU. Thus, the prompt 424 is directed to tenant driven revenue streams for the sought after MAU. The prompt 424 is followed by selectable options 426, which include among them a user definable option.

The prompt 428 invites the prospective proprietor to identify unit driven revenue streams that they would like to be available on the sought after MAU. Selectable options 430 for UDR streams, including a user definable option, follow the prompt 428.

FIG. 5B depicts an example user interface display 440 showing an example user input screen on the user interface 214 of the prospective proprietor device 206 of FIG. 2. This user interface display 440 can be displayed to the user on the user device 206 in conjunction with the process 300 described above. In some examples, this display is generated when the process 300 utilizes the step 308 and follows the interface display 400 of FIG. 5A.

The user interface display 440 is directed to obtaining information from the prospective proprietor regarding how much time they anticipate occupying the sought after MAU. The information provided by the prospective proprietor via the interface display 440 is relevant to valuing the MAU in present and future terms. For example, the more time the prospective proprietor intends to be away from the MAU, the greater the potential value of the MAU due to the greater capacity to use the MAU for TDR streams.

Via the prompts (442, 446, 450) followed by, respectively, the selectable options (444, 448, 452), information relating to the prospective proprietor's MAU occupancy is obtained.

Figure 5C:
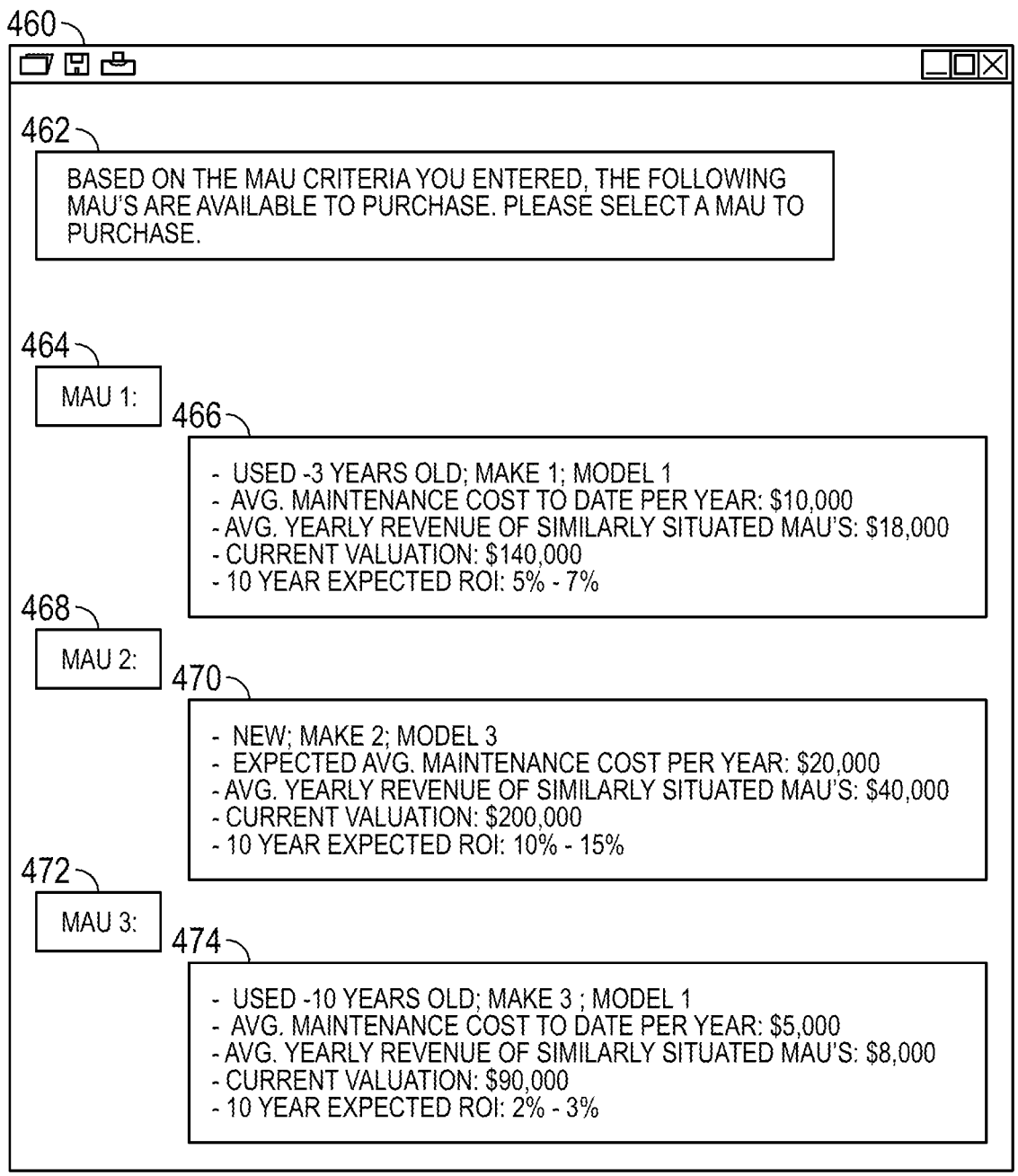
FIG. 5C depicts a further example interface display showing an example input screen on a user device of the system of FIG. 2.

FIG. 5C depicts an example user interface display 460 showing an example user input screen on the user interface 214 of the prospective proprietor device 206 of FIG. 2. The user interface display 460 can be displayed to the user on the user device 206 in conjunction with the process 300 described above. In some examples, this display is generated when the process 300 utilizes the step 312 and follows the interface display 440 of FIG. 5B.

The user interface display 460 is directed to the prospective proprietor's selecting a MAU to purchase based on the information already provided by the prospective proprietor and gleaned from other sources.

The user interface display 460 includes a prompt 462 inviting the prospective proprietor to select one of a list of MAU's (MAU 1, MAU 2, MAU 3) with selectable buttons (464, 468, 472) for each MAU. The listed MAU's match the criteria and information already provided by the prospective proprietor.

The user interface display 460 also includes, for each MAU option, information blocks (466, 470, 474) providing information about each of the MAU options, respectively, such as the MAU's make and model, maintenance costs, valuation, expected return on investment (ROI), etc. In this example, the information blocks also include the average yearly revenue of similarly situated MAU's. In calculating this average yearly revenue, the system 200 can take into account several relevant factors, such as the amount and distribution of the prospective proprietor's amount of time away from the MAU, the TDR and UDR revenue available to the MAU, the MAU's home region, etc., and retrieve revenue data about other MAU's with similar characteristics.

Figure 5D:
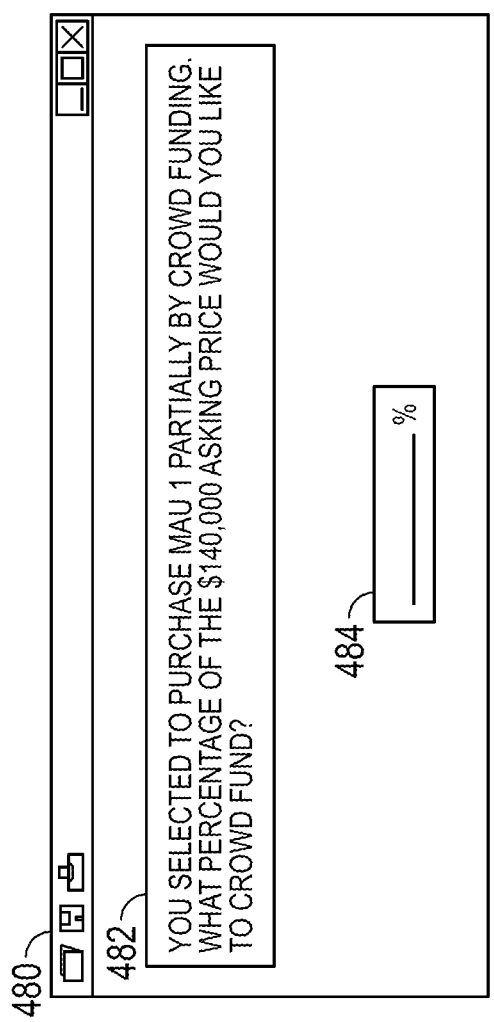
FIG. 5D depicts a further example interface display showing an example user input screen on a user device of the system of FIG. 2.

FIG. 5D depicts an example user interface display 480 showing an example user input screen on the user interface 214 of the prospective proprietor device 206 of FIG. 2. The user interface display 480 can be displayed to the user on the user device 206 in conjunction with the process 300 described above. In some examples, this display is generated when the process 300 utilizes the step 312 and follows the interface display 460 of FIG. 5C, in this case after the prospective proprietor has elected to purchase MAU 1.

The user interface display 480 is directed to a prospective proprietor who previously indicated that they were seeking to fund a portion of their purchase of MAU 1 through crowdfunding. The user interface display 480 includes a prompt 482 requesting the user to enter in the data entry block 484 the percentage of the total MAU purchase price that they would like to crowdfund. This information can be used by the MAU to set the number of equity shares available for purchase and the price of those shares.

Figure 5E:
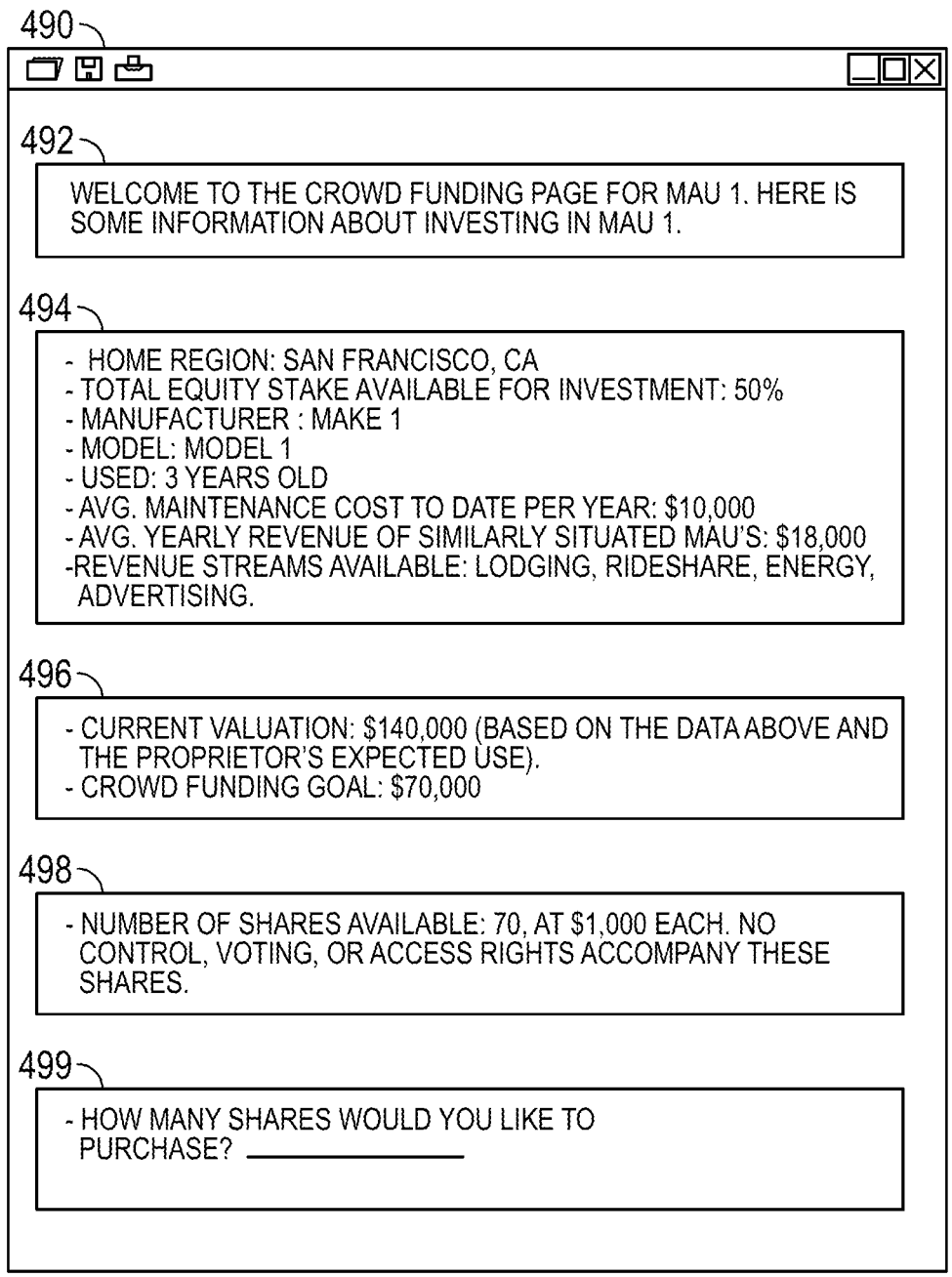
FIG. 5E depicts a further example interface display showing an example user input screen on a device used in conjunction with the system of FIG. 2.

FIG. 5E depicts an example user interface display 490 showing an example user input screen that can appear on a crowdfunder's user device (e.g., a smartphone) when accessing a crowdfunding site associated with the system 200. The user interface display 490 can be displayed in conjunction with the process 300 described above. In some examples, this display is generated when the process 300 utilizes the step 318 and follows the information provided to the system 200 by way of the interface displays 400, 440, 460 and 480, such that the user interface display 490 is specifically directed to crowdfunding 50% of the purchase price of MAU 1, the prospective proprietor having previously indicated they would be self-funding the other 50% of the purchase price.

The user interface display 490 includes a page identification notice 492 explaining the purpose of the site. The user interface display 490 also includes information 494 about MAU 1 that may be pertinent to a crowdfunder's interest in investing in the opportunity. In the information block 496 is provided the current valuation of MAU 1 and the dollar amount of equity available for investment.

In the information block 498 is provided the number of shares available for purchase, the price per share, and an indication of the control rights that go along with those shares. Control rights in shares can be determined by the system 200 and/or the prospective proprietor. In some examples, different types of controlling interest shares in the MAU can be offered for different prices per share, e.g., the price per share increasing with the amount of attendant control in managing and/or accessing the MAU.

In the data entry block 499 the crowdfunder is prompted to enter the number of shares of MAU1 that they would like to purchase.

Figure 6A:
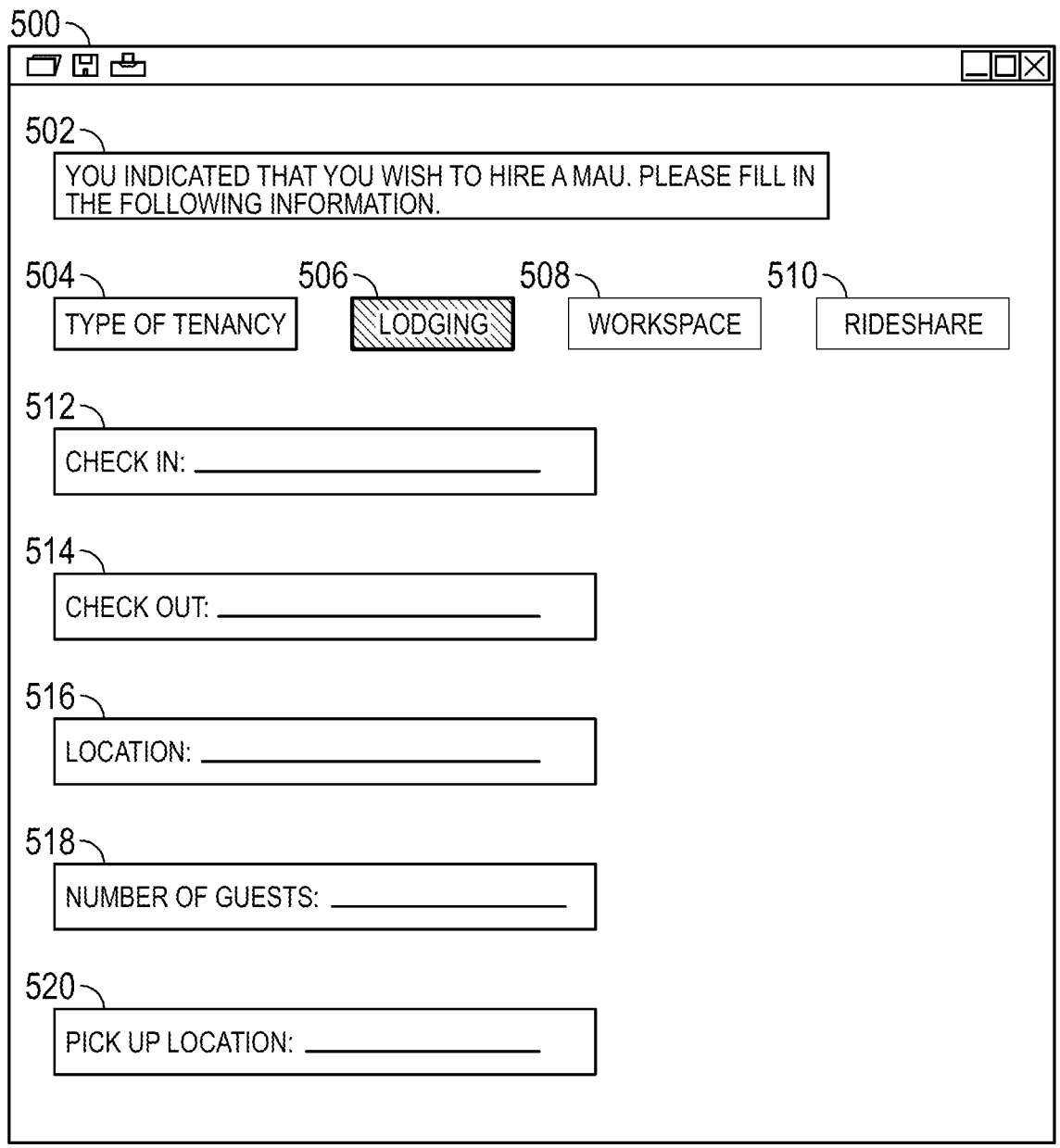
FIG. 6A depicts a further example interface display showing an example input screen on a user device of the system of FIG. 2.

FIG. 6A depicts an example user interface display 500 showing an example user input screen on the user interface 216 of the prospective tenant device 212 of FIG. 2. This user interface display 500 can be displayed to the user on the user device 212 in conjunction with the process 300 described above. In some examples, this display is generated when the process 300 utilizes the step 340.

The user interface display 500 is directed to a prospective MAU tenant seeking to hire a MAU for one or more purposes. The user interface display 500 includes a prompt 502 inviting the user to submit information about the desired tenancy. Block 504 prompts the user to select one of the available types of available tenancy, and the prospective tenant has selected "Lodging" by selecting the selectable button 506, and not the selectable buttons 508 or 510.

Once the user selects "Lodging," questions relating to the lodging are populated in blocks 512, 514, 516, 518, and 520, and the prospective tenant is invited to enter the requested information. The "location" (block 516) of the lodging is the region where the prospective tenant would like the MAU to be primarily situated during their lodging stay in the MAU. The "pickup location" (block 520) is the location where the prospective tenant would like the MAU to pick them up at the commencement of the lodging.

Figure 6B:
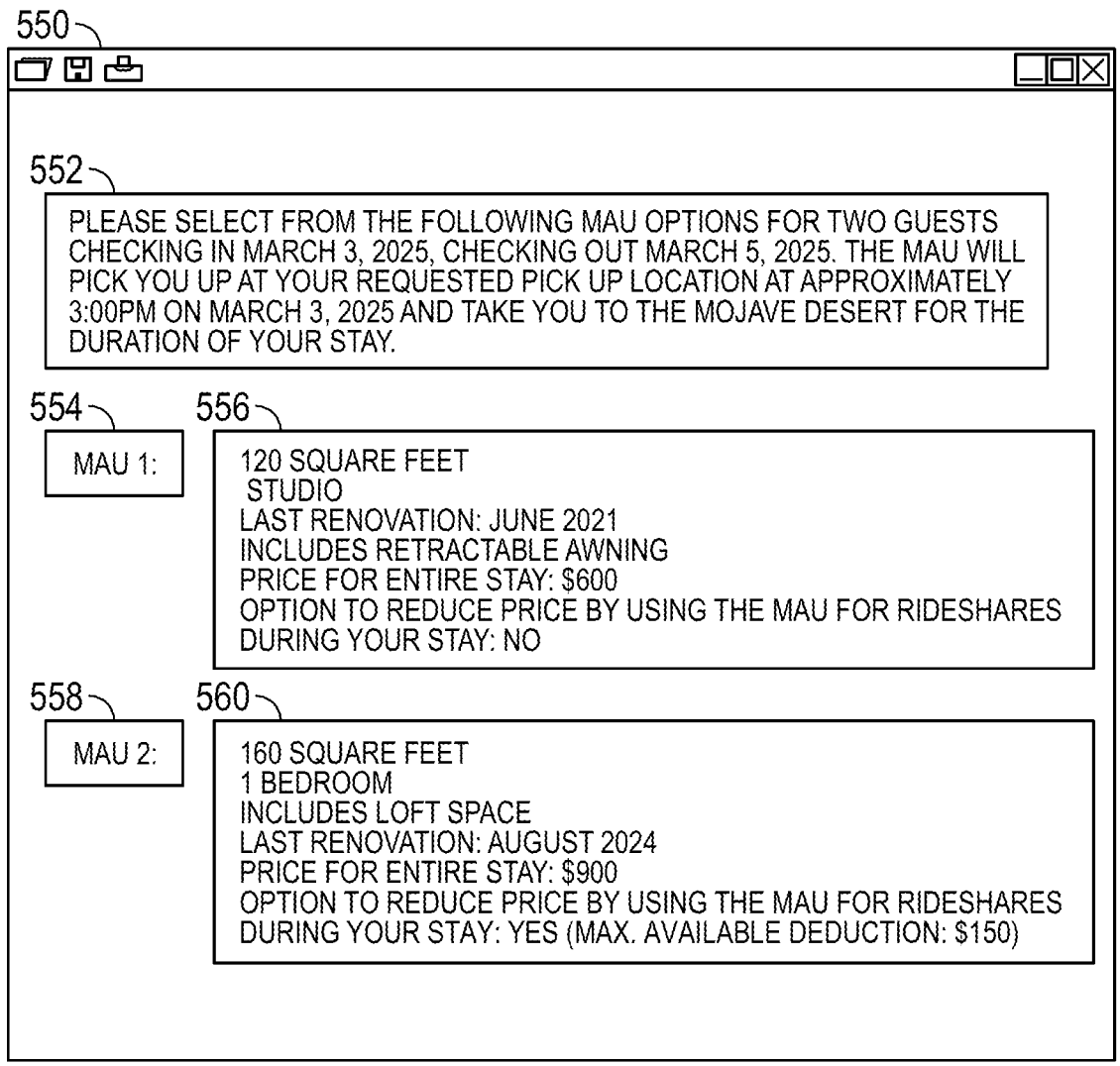
FIG. 6B depicts a further example interface display showing an example input screen on a user device of the system of FIG. 2.

FIG. 6B depicts an example user interface display 550 showing an example user input screen on the user interface 216 of the prospective tenant device 212 of FIG. 2. This user interface display 550 can be displayed to the user on the user device 212 in conjunction with the process 300 described above. In some examples, this display is generated when the process 300 utilizes the step 344 and following interface display 500 of FIG. 6A.

The user interface display 550 is directed to enabling the prospective MAU tenant to view and select from available MAU's that meet their tenancy criteria.

The information block 552 summarizes the type of tenancy that was searched for. The selectable buttons 554 and 558 are to two MAU's that were returned from the search. For each returned MAU, the interface display 550 includes detailed information blocks (556, 560) about the MAU, including, for example, its size and layout, any special features (e.g., a loft space, or a retractable awning, the latter of which could be a helpful feature to have in the selected location of the Mojave Desert), the price for the tenancy, and whether there is an option (which can be set by the proprietor of the MAU and/or the system) to reduce to the price of the tenancy by allowing other tenant revenue streams, such as ridesharing, to remain active during the tenancy.

Figure 7:
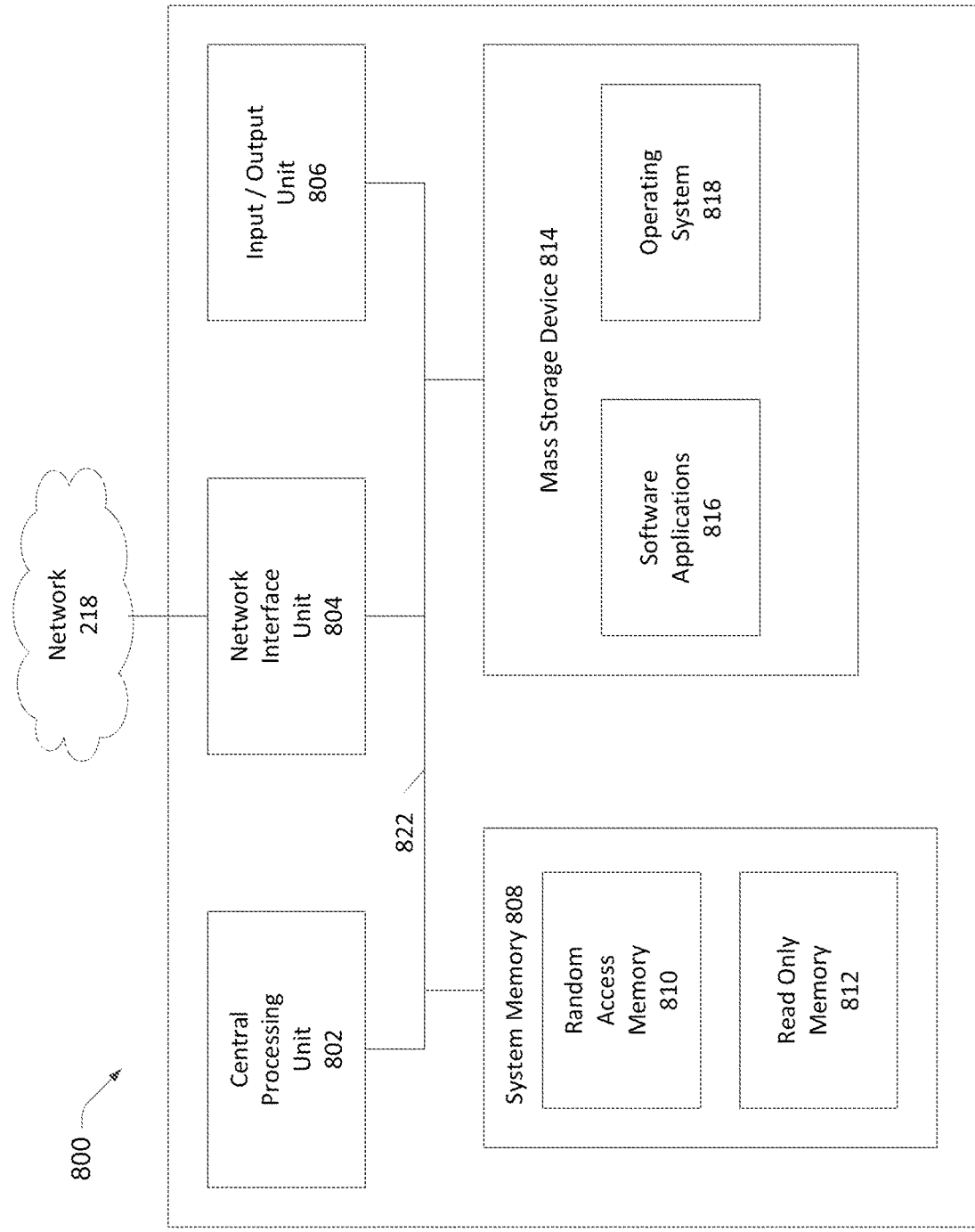
FIG. 7 is a block diagram illustrating portions of an example computer system of the system of FIG. 2.

FIG. 7 schematically illustrates an example computer system suitable for implementing aspects of the system 200 illustrated in FIG. 2, such as the server 202, a third party server, and/or the user devices (206, 212). The modules, databases, and other components of these servers and devices could all be implemented on a common computer system, or the various components could be implemented on one or more separate computer systems that are accessible by one another.

The computer 800, which may be a server computer, for example, includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server computer 800, such as during startup, is stored in the ROM 812. The computer 800 further includes a mass storage device 814. The mass storage device 814 is able to store software instructions and data. One or more of the databases (e.g., the database 204) of the system could be implemented by the mass storage device 814, or one or more of the databases could be implemented by other computer systems accessible by the computer 800.

The mass storage device 814 is connected to the CPU 802 through a mass storage controller (not shown) connected to the system bus 822. The mass storage device 814 and its associated computer-readable data storage media provide non-volatile, non-transitory storage for the server computer 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 800.

According to various embodiments, the server computer 800 may operate in a networked environment using logical connections to remote network devices (such as the others of the server 202, the user device 206, and a third party server) through the network 218, such as a wireless network, the Internet, or another type of network. The server computer 800 may connect to the network 218 through a network interface unit 804 connected to the system bus 822. It should be appreciated that the network interface unit 804 may also be utilized to connect to other types of networks and remote computing systems. The server computer 800 also includes an input/output controller 806 for receiving and processing input from a number of other devices, including the user interface (214, 216) generated on the user device (206, 212), respectively, which could include a touch user interface display screen, or another type of input device, as described above. Similarly, the input/output controller 806 may provide output to a touch user interface display screen or other type of output device.

As mentioned briefly above, the mass storage device 814 and the RAM 810 of the server computer 800 can store software instructions and data. The software instructions include an operating system 818 suitable for controlling the operation of the server computer 800. The mass storage device 814 and/or the RAM 810 also store software instructions, that when executed by the CPU 802, cause the server computer 800 to provide the functionality of the server computer 800 discussed in this document. For example, when the server computer 800 corresponds to the server 202, the mass storage device 814 and/or the RAM 810 can store software instructions that, when executed by the CPU 802, cause the server computer 800 to implement the MAU valuation module 220, a proprietor initiation module 222, a MAU funding module 224, a tenant initiation module 226, a tenant management module 227, one or more MAU revenue modules 228a, 228b, 228c, and a revenue optimizing module 230, and any other modules incorporated to perform the various functionalities described.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer-implemented method, comprising:
   identifying a plurality of revenue streams for a mobile autonomous unit, the mobile autonomous unit including an enclosure for a person to ride therein; and
   activating the plurality of revenue streams by causing the mobile autonomous unit to move between at least two locations such that the plurality of revenue streams are simultaneously generating revenue while the mobile autonomous unit is moving between the at least two locations,
   wherein one of the plurality of revenue streams is generated by a person's use of the mobile autonomous unit; and
   wherein another of the plurality of revenue streams is generated by the mobile autonomous unit itself.

2. The computer-implemented method of claim 1, wherein the enclosure is configured as a living space and as a tenancy space.

3. The computer-implemented method of claim 1, wherein the mobile autonomous unit includes an electricity generating device.

4. The computer-implemented method of claim 3, wherein the electricity generating device includes at least one solar panel.

5. The computer-implemented method of claim 3, wherein one of the plurality of revenue streams includes sale of energy generated by the mobile autonomous unit.

6. The computer-implemented method of claim 1, wherein one of the plurality of revenue streams includes one of:
   i) a lodging in the mobile autonomous unit;
   ii) a riding in the mobile autonomous unit to a destination;
   iii) a using of the mobile autonomous unit as a workspace; and
   iv) a using of the mobile autonomous unit as a social space.

7. The computer-implemented method of claim 1, wherein one of the at least two locations is selected based on a predicted weather at the one of the at least two locations.

8. The computer-implemented method of claim 7, wherein the one of the at least two locations is selected based on a pre-defined geographical area in which the mobile autonomous unit spends more time than in any other pre-defined geographical area.

9. A system, comprising:
   a mobile autonomous unit including an enclosure for a person to ride therein;
   at least one readable and writable data storage device storing data related to a plurality of pre-defined geographical areas and the mobile autonomous unit;
   at least one processor; and
   memory encoding instructions that, when executed by the at least one processor, causes the at least one processor to:

identify a plurality of revenue streams for the mobile autonomous unit; and activate the plurality of revenue streams by causing the mobile autonomous unit to move between at least two locations such that the plurality of revenue streams are simultaneously generating revenue while the mobile autonomous unit is moving between the at least two locations, wherein one of the plurality of revenue streams is generated by a person's use of the mobile autonomous unit; and wherein another of the plurality of revenue streams is generated by the mobile autonomous unit itself.

10. The system of claim 9, wherein the enclosure is configured as a living space and as a tenancy space.

11. The system of claim 9, wherein the mobile autonomous unit includes an electricity generating device.

12. The system of claim 11, wherein the electricity generating device includes at least one solar panel.

13. The system of claim 11, wherein one of the plurality revenue streams includes sale of energy generated by the mobile autonomous unit.

14. The system of claim 11, wherein one of the plurality of revenue streams includes one of:
i) a lodging in the mobile autonomous unit;
ii) a riding in the mobile autonomous unit to a destination;
iii) a using of the mobile autonomous unit as a workspace; and
iv) a using of the mobile autonomous unit as a social space.

15. The system of claim 9, wherein one of the at least two locations is selected based on a predicted weather at the one of the at least two locations.

16. The system of claim 15, wherein the one of the at least two locations is selected based on a pre-defined geographical area in which the mobile autonomous unit spends more time than in any other pre-defined geographical area.

17. A computer-implemented method, comprising:

identifying a plurality of revenue streams for a mobile autonomous unit, the mobile autonomous unit including an enclosure for a person to ride therein, the plurality of revenue streams including a revenue stream from sale of energy generated by the mobile autonomous unit; and causing the mobile autonomous unit to move to a location to generate energy based on a predicted weather at the location such that the plurality of revenue streams are simultaneously generating revenue while the mobile autonomous unit is moving to the location, wherein one of the plurality of revenue streams is generated by a person's use of the mobile autonomous unit; and wherein another of the plurality of revenue streams is generated by the mobile autonomous unit itself.

18. The computer-implemented method of claim 17, wherein the mobile autonomous unit includes an electricity generating device including at least one solar panel.

19. The computer-implemented method of claim 18, wherein the predicted weather is predicted to be sunny.

20. The computer-implemented method of claim 17, wherein the enclosure is configured as a living space and as a tenancy space; and wherein one of the plurality of revenue streams includes one of:
i) a lodging in the mobile autonomous unit;
ii) a riding in the mobile autonomous unit to a destination;
iii) a using of the mobile autonomous unit as a workspace; and
iv) a using of the mobile autonomous unit as a social space.

\* \* \* \* \*